United States Patent [19]

Yabuoshi et al.

[11] Patent Number: 4,477,967
[45] Date of Patent: Oct. 23, 1984

[54] METHOD FOR MAKING THE STATOR FOR ELECTRIC MOTOR

[75] Inventors: Susumu Yabuoshi, Toyota; Shogo Uzura, Okazaki; Nobuyuki Hayashi, Nagoya, all of Japan

[73] Assignee: Nippondenso Co., Ltd., Kariya, Japan

[21] Appl. No.: 525,792

[22] Filed: Aug. 23, 1983

Related U.S. Application Data

[63] Continuation of Ser. No. 284,950, Jul. 20, 1981, abandoned.

[30] Foreign Application Priority Data

Jul. 24, 1980 [JP] Japan ............................ 55-105561[U]

[51] Int. Cl.³ ............................................. H02K 15/02
[52] U.S. Cl. ........................................ 29/596; 310/194; 336/206
[58] Field of Search .......................... 310/42, 194, 208; 29/596, 605; 336/206, 209

[56] References Cited

U.S. PATENT DOCUMENTS

| | | | |
|---|---|---|---|
| 1,864,331 | 6/1932 | Whitesmith | 336/206 X |
| 2,118,924 | 5/1938 | Henderson | 336/206 |
| 3,549,926 | 12/1970 | Pentland | 336/206 X |
| 3,868,766 | 3/1975 | Gramlich et al. | 310/194 X |

FOREIGN PATENT DOCUMENTS 1208816  2/1963  Fed. Rep. of Germany ...... 336/206

Primary Examiner—John Gonzales
Attorney, Agent, or Firm—Cushman, Darby & Cushman

[57] ABSTRACT

A conductor of a rectangular cross-section is overlapped with an insulator having a greater width than the width of the conductor and wound to form a coil assembly. The oversized portions of the insulator are folded and cemented together. The coil assembly is mounted on a stator pole core so that the folded insulator portions are respectively adjacent to the pole piece of the core and to the inner wall of a cylindrical yoke when the pole core is secured to the yoke. The folded portions of the insulator are depressed by an amount sufficient to allow the coil assembly to be firmly clamped in position.

7 Claims, 8 Drawing Figures

METHOD FOR MAKING THE STATOR FOR ELECTRIC MOTOR

This is a continuation of application Ser. No. 284,950, filed July 20, 1981, abandoned.

BACKGROUND OF THE INVENTION

The present invention relates to a stator structure of an electric motor and a method for making the stator at a low production cost.

A known method for insulating a stator coil involves the use of an insulator having the width of the conductor of rectangular cross-section to be interposed between adjacent turns of the conductor. Subsequently the coil is entirely wrapped around by a cotton tape. The cotton tape is then impregnated with a thermosetting resin such as pitch varnish.

However, the taping and impregnating processes involve a substantial amount of labor, resulting in a high production cost. Since it is impossible to automate the taping process, the latter constitutes a barrier to the modernization of the whole process. Furthermore, it is difficult to ensure that the coil assembly have an appropriate dimension so that it is held tightly between 12e yoke and pole pieces. This might lead to the loosening of the coil assembly due to vibrations and a short-circuit failure would result. A further disadvantage is that the impregnating agent tends to cause a skin rash.

SUMMARY OF THE INVENTION

The present invention has, for its object, the provision of a stator incorporating the coil assembly manufactured according to the invention and a method for making the coil assembly which allows automation of the coil making process.

Another object of the invention is to provide a method whereby the stator is manufactured at a low production cost.

A further object of the invention is to provide a method which eliminates the taping and impregnation processes and their attendant disadvantages.

A still further object of the invention is to provide a method which permits the coil assembly to be secured firmly between the yoke and pole pieces.

A still further object of the invention is to provide a stator which can withstand vibrations without causing short-circuit failures.

These objects are obtained by the use of an insulator having a greater width than the width of the conductor. The oversized portions of the insulator which project laterally of the conductor are folded and cemented together.

The width of the insulator is greater than the total of the width of the conductor plus twice as much as the thickness of the conductor. Preferably the width of the insulator is equal to or greater than the total of the width of the conductor plus five times as much as the thickness of the conductor.

Preferably the insulator is formed of a sheet which has been impregnated with partially cured thermosetting resin or the like to allow the folded oversized portions to be set simply by application of heat. By the appropriate dimensioning of the insulator the oversized insulator portions act as an appropriate tightening margin for the coil assembly when the latter is clamped between the yoke and pole pieces.

BRIEF DESCRIPTION OF THE DRAWINGS

Advantanges of the present invention will become apparent from the following description given by way of example only with reference to the accompanying drawings, in which.

DETAILED DESCRIPTION

Figure 1:
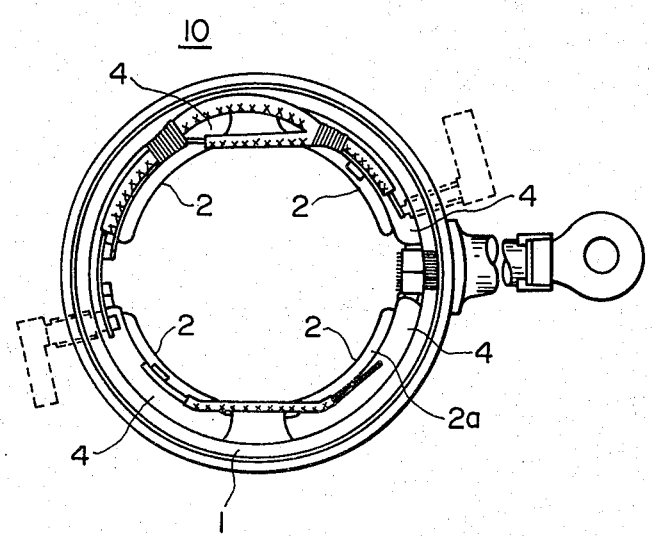
FIG. 1 is an end view of the stator according to the invention.
Figure 2:
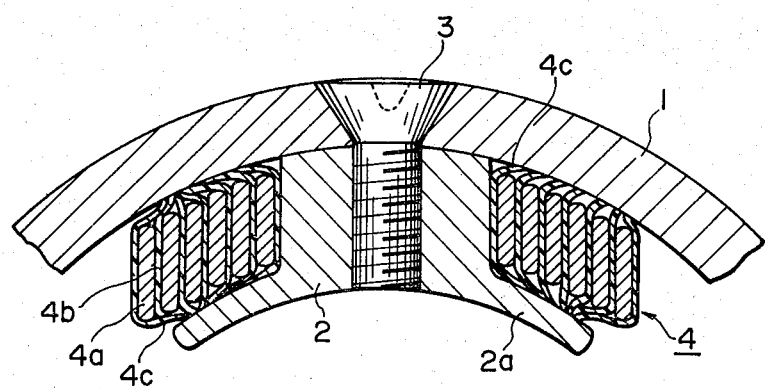
FIG. 2 is an enlarged, partial cross-sectional view of the embodiment of FIG. 1.

In FIG. 1 a stator 10 of the invention for an electric motor is illustrated as comprising a cylindrical yoke 1, stator pole cores 2 mounted diametrically opposite to each other on the inner wall of the yoke 1. As clearly shown in FIG. 2, each stator pole core is secured to the yoke 1 by a screw 3 and is formed with an arc-shaped pole piece 2a extending parallel to the inner wall of the yoke 1 to define a space therewith in which a coil assembly 4 is mounted. The coil assembly 4 comprises several turns of a conductor 4a having a rectangular cross-section with an insulator 4b interposed between adjacent turns. The conductor 4a is held in position with their sides parallel with the web portion of the pole core 2.

Figure 3:
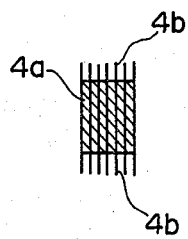
FIG. 3 is a transverse cross-sectional view of the coil assembly of the invention illustrating the oversized portions of the insulator in relation to the coiled conductor.
Figure 4:
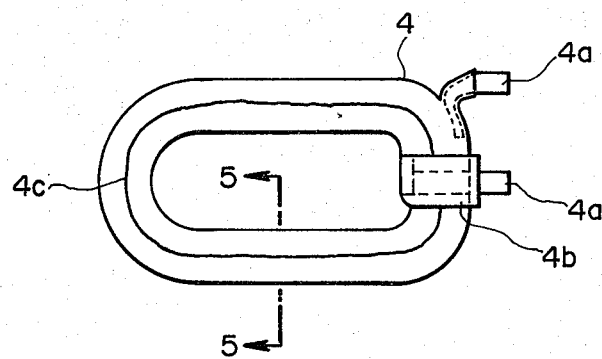
FIG. 4 is a top plan view of the coil assembly of the invention.
Figure 5:
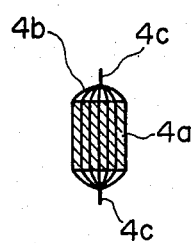
FIG. 5 is a cross-sectional view taken along the lines 5—5 of FIG. 4.
Figure 6:
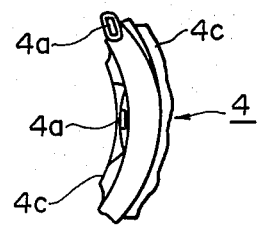
FIG. 6 is an end view of the coil assembly of FIG. 4.

More specifically the coil assembly 4 is manufactured as follows. The conductor 4a, with the insulator 4b being attached to one side of conductor 4a, is spirally wound by means of a winding machine, not shown, to form a loop of several turns so that the insulator 4b forms a plurality of parallel sheets with their sides oppositely extending along the edges of each turn as seen in FIG. 3. The width of the insulator 4b is greater than the total of the width of conductor 4a plus twice as much as the thickness of conductor 4a. Preferably the insulator width is equal to the total of the width of conductor 4a plus five times as much as the thickness of conductor 4a. The opposite edges, or oversized portions, of the insulator 4b are then assembled or folded in a manner as will be described to form ledges 4c as shown in FIG. 5, which will be seen as a loop on each side of the coil 4 (FIG. 4). The coil assembly 4 is then bent along its longitudinal axis as shown in FIG. 6 so that it conforms to the curvature of the yoke 1 and pole piece 2a.

The motor 10 is assembled by fitting the coil assembly 4 on the pole core 2 so that the insulator ledges 4c are on the upper and lower sides of the coil and then fastening the pole core 2 by screw 3 to the yoke 1. As the pole core is being screwed to the yoke 1 the ledges 4c are collapsed and pressed tightly between the pole piece 2a and the yoke 1, so that the coil assembly 4 is firmly clamped in position. No loosening thus occurs even under repeated application of shocks. Therefore, the insulator 4b is free from wear due to loosening and as a result no short-circuit failure occurs.

Suitable material for the insulator 4b includes a sheet of partially cured thermosetting resin or a sheet comprising a base of a cotton, nonwoven or synthetic cloth which is impregnated with a thermosetting material and partially cured, or a high polymer film such as polyester and Aramit sheet which is available from Dupont under the trademark "Nomex". The ledges 4c are preferably formed by high-frequency heating or thermal pressure heating and flattened out to cover the opposite edges of the multi-layered turns. Kraft paper could also serve as the insulator. In this case the protruding edges are cemented by insulative adhesive.

Figure 7:
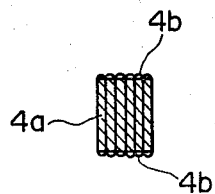
FIG. 7 is a cross-sectional view of the coil assembly showing the oversized portions being folded in a different manner.

It is obvious that the insulator edges could be folded over one upon another as illustrated in FIG. 7 rather than forming the ledges 4c.

Figure 8:
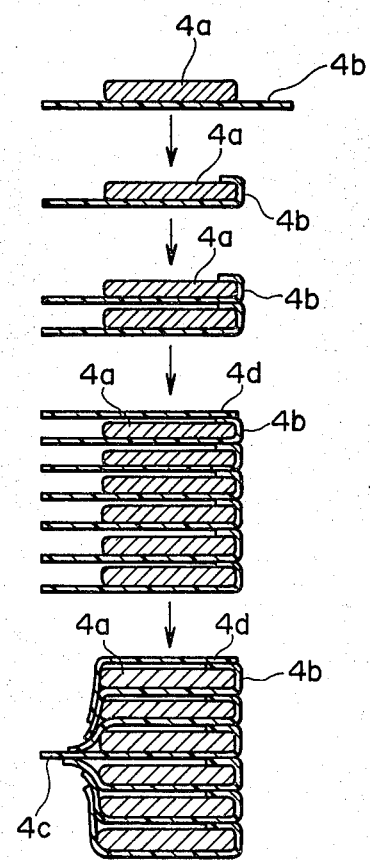
FIG. 8 is an illustration of a preferred embodiment showing modifed steps for making the coil assembly.

In the embodiment described above there is a likelihood of the lower ledge 4c from protruding out into the path of the rotor, not shown. This can be avoided by an embodiment shown in FIG. 8. In step 1 the insulator 4b is attached to one side of the conductor 4a and in step 2 the lower edge of the insulator 4b is turned over around the overlying conductor 4a. In step 3, the insulator-attached conductor is mounted on a winding machine, not shown, to form several turns and in step 4 an insulator 4d having the width of insulator 4b is placed on one side of the first turn and cemented to the turned-over edge of the first insulator 4b. In step 5 the the other edges of the insulator are assembled to form a ledge 4c. The coil assembly 4, formed in this manner, is mounted on the pole core 2 which is secured to the yoke 1 with the ledge 4c facing thereto.

What is claimed is:

1. A method for making a pole of an electric motor, the stator comprising a cylindrical yoke and a pole core adapted to be secured to said yoke and having a pole piece which is curved in conformance to the curvature of the inner wall of said yoke, comprising the steps of:
   (a) placing a sheet of an insulator on one surface of a conductor having a rectangular cross-section, the width of said sheet being greater than the width of said conductor, and forming said conductor and insulator into a coil of several turns so that said insulator is positioned between successive turns of conductors;
   (b) folding all the oversized portions of said insulator of said turns;
   (c) cementing the folded portions together;
   (d) mounting said coil on said pole core; and
   (e) securing said pole core to said yoke so that said folded portions are held under pressure exerted thereto by the yoke and said pole piece.

2. A method as claimed in claim 1, wherein the step (b) comprises forming each of the oversized portions into a ledge and folding the ledge toward the coil.

3. A method as claimed in claim 1, wherein said insulator comprises a sheet of a partially cured thermosetting resinous material.

4. A method as claimed in claim 1, wherein said insulator sheet comprises a base formed of one of a cotton, nonwoven and synthetic cloth impregnated with a partially cured thermosetting resinous material.

5. A method as claimed in claim 1, wherein said insulator comprises a high polymer film.

6. A method as claimed in claim 2, 3, 4, or 5, wherein the step (c) comprises heating said oversized portions.

7. A method as claimed in claim 1, wherein the step (a) further comprises turning over the oversized portion of said insulator around the edge of said conductor.

* * * * *